F. E. DE LA MOTA.
EGG RECEPTACLE.
APPLICATION FILED DEC. 19, 1916.

1,267,988.

Patented May 28, 1918.

INVENTOR
Francisco Espaillat de la Mota.
BY Victor J. Evans
ATTORNEY

WITNESSES

UNITED STATES PATENT OFFICE.

FRANCISCO ESPAILLAT DE LA MOTA, OF SAN PEDRO DE MACORIS, DOMINICAN REPUBLIC.

EGG-RECEPTACLE.

1,267,988.  Specification of Letters Patent.  Patented May 28, 1918.

Application filed December 19, 1916. Serial No. 137,898.

*To all whom it may concern:*

Be it known that I, FRANCISCO E. DE LA MOTA, a subject of Republic of Dominicana, residing at San Pedro de Macoris, in the Dominican Republic, have invented new and useful Improvements in Egg-Receptacles, of which the following is a specification.

This invention relates to a coating device which may be advantageously used when it is desired to apply a preservative coating to eggs, such as described in my pending process application, filed June 27, 1916, Serial Number 106,283, although the device is so constructed that it may be advantageously used for applying a preservative covering to other perishable food products, if found desirable.

The primary object of the invention is to provide a device for this purpose which will serve as a holder for the eggs to be coated and the preservative material with which the eggs are coated, and is so constructed that the preservative material may be withdrawn to permit the coated eggs to dry in a rapid and satisfactory manner and without the presence of air bubbles in the coating as often occurs when the eggs are dipped in the coating solution.

Another object of the invention is to provide a coating device in which the eggs may be immersed in the preservative material, one or more times according to the consistency of the preservative material and the thickness of the coat desired upon the eggs, and in such a manner as to prevent the preservative material being subjected to the drying influence of the atmosphere, or the operator of the device being burned by the ether usually used in connection with such material.

A further object of the invention is to provide the coating device with egg holding trays which are so shaped, that when the trays are arranged within the container for holding the coating material each tray will have the side wall thereof spaced a sufficient distance from the wall of the container to permit the tray being readily grasped by the fingers of the operator when it is desired to remove the same from the receptacle.

A still further object of the invention is to so construct the egg holding trays that when the device is in use the coating solution may readily gain access to each tray and when the coating solution has been withdrawn from the container, the coated eggs will be subjected to the drying influence of the atmosphere thus insuring the eggs being uniformly coated with the preservative material.

With these and other objects in view, the invention resides in the novel combination and arrangement of parts, which will be hereinafter described and particularly pointed out in the claims.

The preferred embodiment of the invention has been illustrated in the accompanying drawing, although no restriction is necessarily made to the precise details of construction therein shown, as changes, alterations, and modifications, within the scope of the claims may be resorted to when desired.

In the drawing.

Like characters of reference denote corresponding parts throughout the several views in the drawing.

Figure 1:
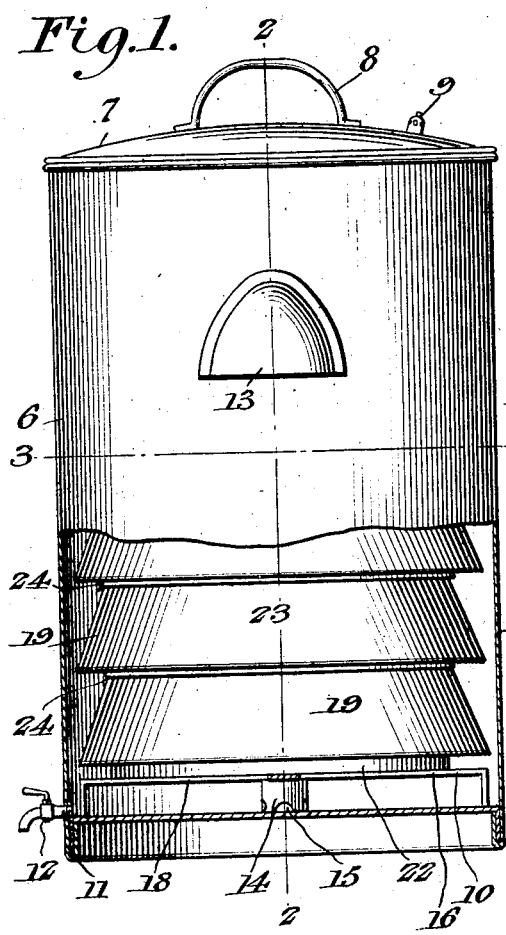
Figure 1 is a view in elevation partly in section of a coating device constructed in accordance with the invention.
Figure 2:
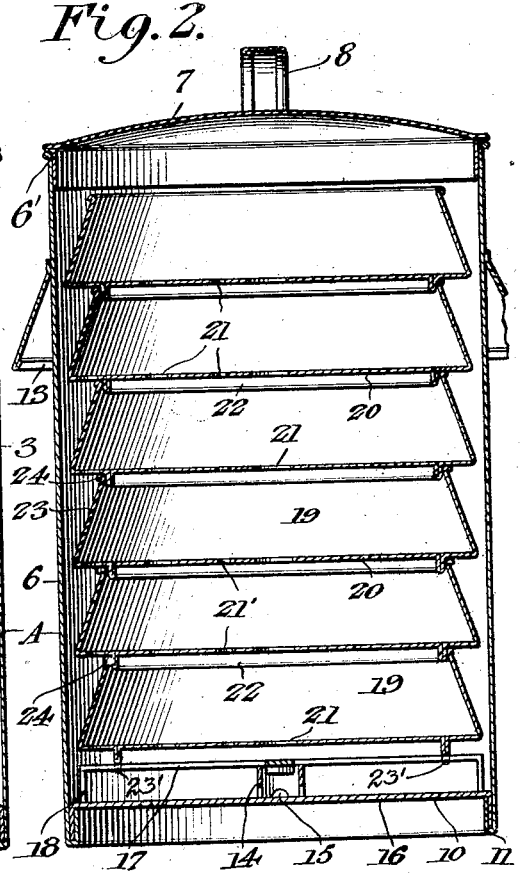
Fig. 2 is a vertical transverse sectional view on the line 2—2 of Fig. 1.
Figure 4:
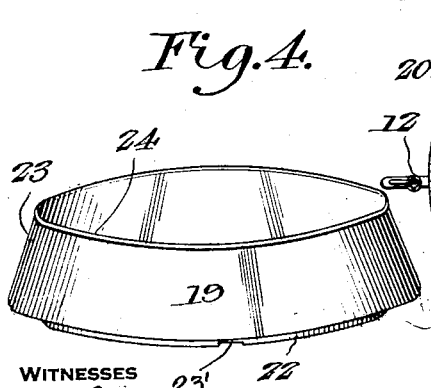
Fig. 4 is a detailed view of one of the egg holding trays.
Figure 3:
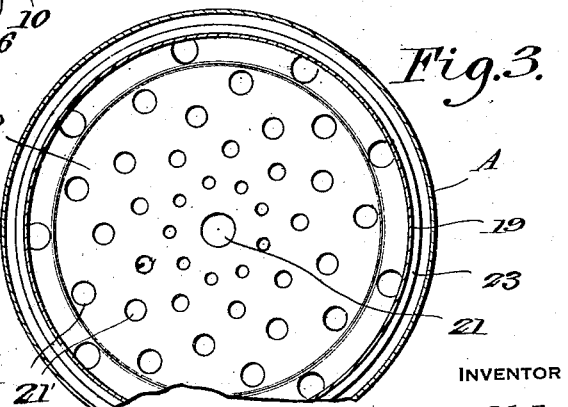
Fig. 3 is a horizontal transverse section on the line 3—3 of Fig. 1.

Referring now to the drawing in detail, the letter A designates a coating device constructed in accordance with the invention and which is designed to enable my process of preserving eggs described in the above mentioned pending application to be carried out in a satisfactory manner, the device being particularly adapted to be used in applying the colloid solution to the eggs, although it may be used in connection with the anointing bath if found desirable, or the device may be used to apply both the anointing and colloid solutions to the eggs if desired.

The improved coating device A comprises a cylindrical receptacle 6 which may be formed from any material which will be unaffected by the colloid solution and is provided with an open top 6', to be closed by a flanged cover 7, provided with a handle 8 and a pressure operated valve 9, said receptacle having its bottom 10 spaced from the lower end thereof to form a supporting flange 11 above which is arranged a drain cock 12.

The receptacle 6 has secured thereto suitable handles 13 by means of which the coating device may be carried while the bottom 10 thereof is provided upon its upper face with a centrally located cylindrical bearing stud 14 having circumferentially arranged and spaced drain openings 15 therein.

An egg tray support 16 which is in the form of a frame is arranged within the receptacle 6 for contact with the bearing stud 14 and is formed from crossed strips 17, the terminals of which are bent to form supporting feet 18 contacting with the bottom 10 of the receptacle.

A plurality of egg trays 19 is arranged with the receptacle 6 in superimposed relation, with the lowermost tray resting upon the egg tray support 16, said trays being formed from material which will be unaffected by the colloid solution.

Each tray 19 which is circular in shape comprises a circular bottom 20 having a centrally arranged opening 21 about which are arranged concentric rows of circumferentially extending and spaced openings 21, said openings gradually increasing in size toward an annular flange 22 upon the underface of said bottom and spaced from the lower edge of the inwardly inclined wall 25 of the tray 19 and which provides the tray with an open top of less diameter than the perforated bottom 20, so that when the trays 19 are arranged one upon the other, the flange 22 upon one tray will extend within the open top of the tray beneath the same to prevent lateral movement of the trays.

The flange 22 on one of the trays has formed therein spaced recesses 23', so that when the trays are arranged within the receptacle the cross strips 17 will be received in the recesses in the flange on the lowermost tray and lock the trays against lateral movement on the frame 16.

The upper marginal edge of the wall 23 of each tray is rolled to form a bead 24 by means of which the trays may be lifted from the container 6 when found desirable, it, of course, being understood that by inclining the wall 23 inwardly the bead is spaced a sufficient distance from the wall of the container to enable the bead to be easily grasped for this purpose.

When it is desired to use the device to apply either of the coating solutions to the eggs, the trays 19 are first packed with the eggs and arranged within the container 6 in superimposed relation with the lowermost tray resting upon the tray support 16.

The coating solution is now poured into the container 6 until the trays 19 are completely covered and allowed to remain a sufficient length of time according to the consistency of the fluid and the thickness of the coat desired upon the eggs being applied thereto as the fluid is withdrawn from the container through the drain cock 12, thus insuring each egg being uniformly coated with the preservative material and in such a manner that the presence of air bubbles in the coatings is obviated.

Upon the removal of the coating solution from within the container 6, the cover 7 may be removed to allow the atmosphere to contact with the coated eggs and dry the same.

It will, of course, be understood that where more than one coat of preservative material is desired, the process may be again repeated without removing the eggs from the receptacle.

From the foregoing description, taken in connection with the accompanying drawing, it is at once apparent that a coating device has been provided which will enable my process for preserving eggs to be carried out in a rapid and satisfactory manner and that although the device is inexpensive of manufacture, it is strong and durable in use.

Having thus described the invention, what is claimed as new, is:

1. In a device of the class described, a casing, a central stud upon the bottom of said casing, crossed bars engaging said stud having angularly extending portions at their outer ends contacting with the bottom of said receptacle, and a plurality of detachably connected trays resting upon said crossed bars.

2. In a device of the class described, a casing, a central stud upon the bottom of said casing, crossed bars engaging said stud and the bottom of said casing, and a tray having an annular flange upon the bottom thereof provided with spaced recesses through which said bars pass.

In testimony whereof I affix my signature.

FRANCISCO ESPAILLAT de la MOTA.

Copies of this patent may be obtained for five cents each, by addressing the "Commissioner of Patents, Washington, D. C."